Jan. 11, 1949.  R. A. DARBY  2,458,896
DIFFERENTIAL BALANCE FOR AIRFOILS
Filed Aug. 10, 1942  2 Sheets-Sheet 1
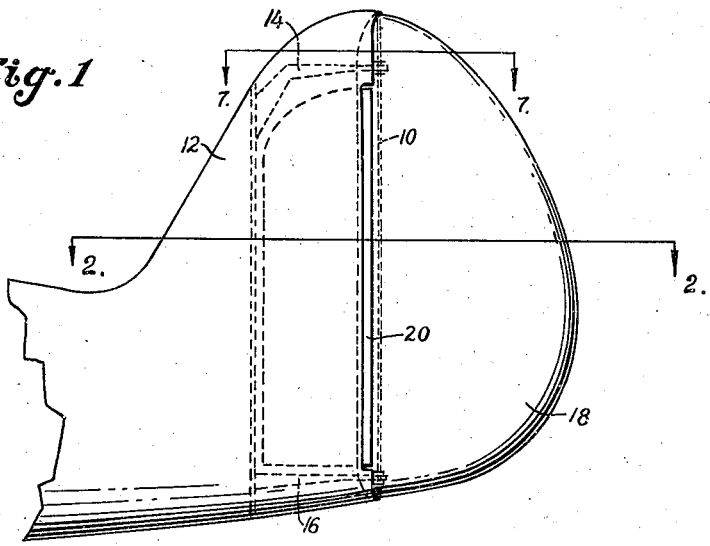
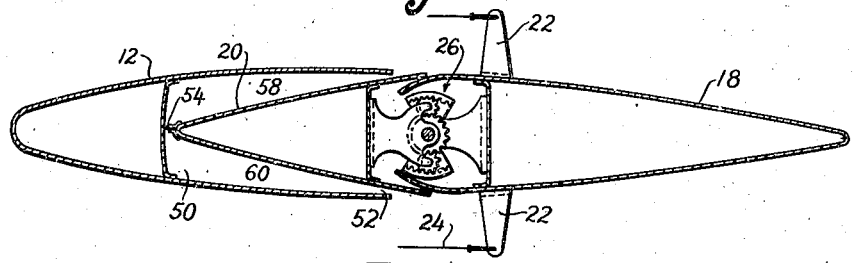
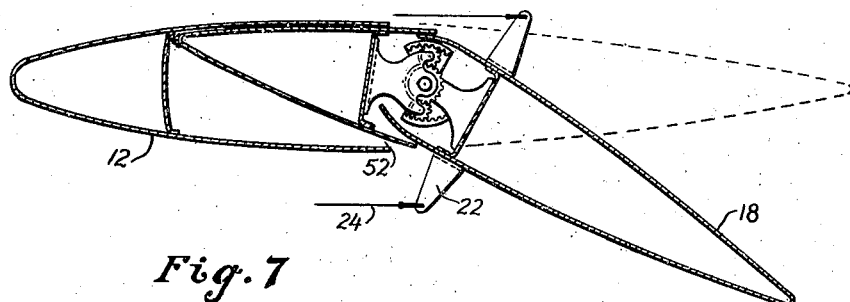
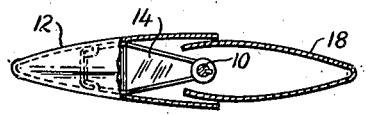
INVENTOR
ROBERT A. DARBY.
BY
ATTORNEY Jan. 11, 1949.  R. A. DARBY  2,458,896
DIFFERENTIAL BALANCE FOR AIRFOILS
Filed Aug. 10, 1942
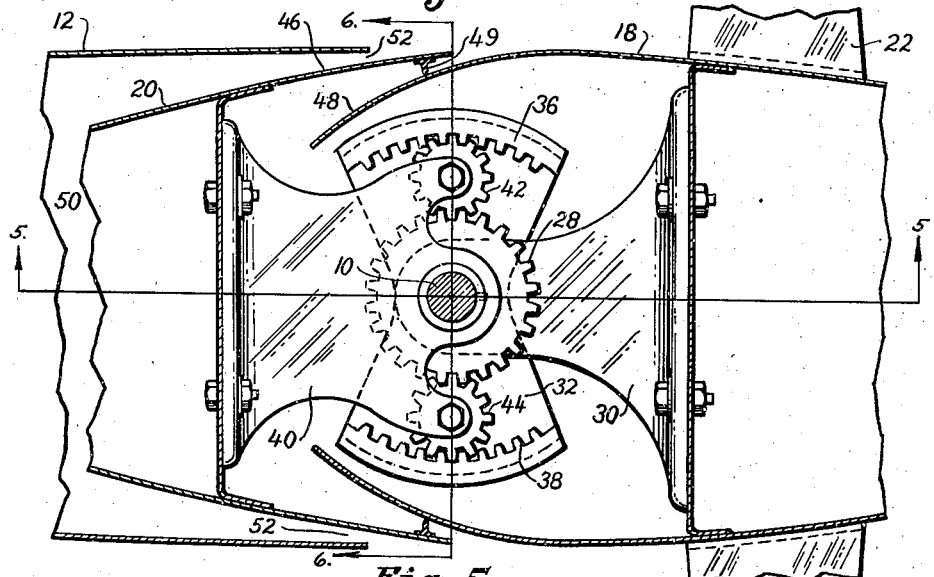
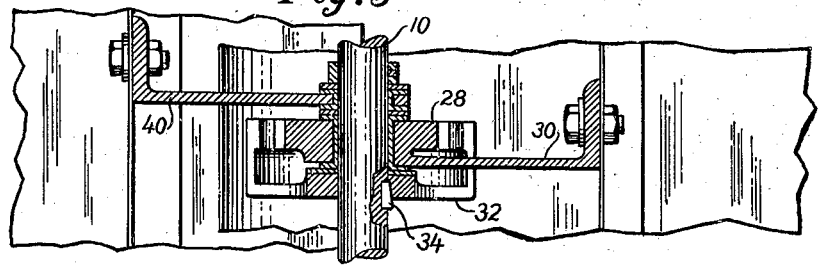
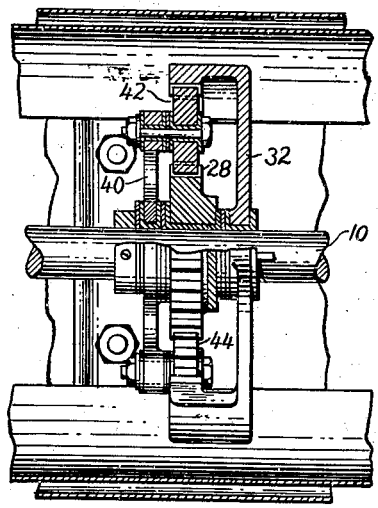
INVENTOR
ROBERT A. DARBY.
BY
ATTORNEY Patented Jan. 11, 1949

2,458,896

UNITED STATES PATENT OFFICE 2,458,896

DIFFERENTIAL BALANCE FOR AIRFOILS

Robert A. Darby, Eggertsville, N. Y., assignor to Curtiss-Wright Corporation, a corporation of Delaware Application August 10, 1942, Serial No. 454,348

10 Claims. (Cl. 244—87)

1

This invention relates to an improved means for balancing aircraft control surfaces and is applicable to any such surfaces, as for example, in an elevator, rudder, aileron or the like.

In the past it has been found desirable to balance aircraft control surfaces by providing an additional surface connected with the control surface and spaced from the hinge axis of the control surface for projection into the air stream when the control surface is moved from its neutral position. The reaction of the air flow on the projected surface establishes a turning moment thereon tending to balance the air flow turning moment on the control surface to thereby reduce the force necessary to effect deflection of the control surface. This construction is objectionable in three respects: first, at medium and large throws of the control surface the nose of the balance moves outside the airfoil contour, and when this occurs abrupt changes take place in the hinge moments which, in the case of a rudder, are thought to be associated with the condition of rudder lock which is experienced on some airplanes. Second, in the case of airplanes which are dived to very high speeds, the conventional type of leading edge balance causes a small local bulge outside the airfoil contour even at the small control surface deflections required for trim at the high speed in question. A local sharp curvature of this nature reduces the critical speed of the airfoil and compressibility phenomena may cause a rapid large change in pressure that will produce overbalance of the control surface. Third, a conventional type of balance offers measurable drag even with the low control surface displacements necessary for high trim. To eliminate these objections, the practice is to extend leading edge of the control surface into a recess in the trailing edge of the airfoil in such a way that the differential pressure on opposite sides of the airfoil acts on the leading edge portion of the control surface so as to aid in turning the surface. The difficulty with this practice is that the leading edge of the control surface must be quite short if it is not to extend through the fixed airfoil when the control surface is deflected to any appreciable extent. As a result, since the balancing force acting on the leading edge of the control surface is a function of the chord length of the leading edge balance, the balance force obtainable from this conventional structure is necessarily quite limited. This is especially true if the airfoil is relatively thin.

Accordingly, it is an object of this invention to provide an improvement over this leading edge

2 type of balance for a control surface whereby a greater chord length of leading edge balance may be obtained and which balance at no time protrudes from the fixed airfoil.

Specifically, it is an object of this invention to provide a leading edge balance for a control surface in which there is a differential movement between the control surface and its balance, the angle of movement of the leading edge balance being less than the angle of movement of the control surface. This differential movement permits the use of a greater chord length of leading edge balance and which balance at no time protrudes from the fixed airfoil.

Further objects of this invention will become apparent in reading the annexed detailed description in connection with the drawings, in which:

Fig. 1 is a side elevation of the invention as applied to an aircraft rudder;

Fig. 2 is a section on the line 2—2 of Fig. 1;

Fig. 3 is a view similar to Fig. 2 with the rudder in deflected position;

Fig. 4 is an enlarged view of a portion of Fig. 2;

Figs. 5 and 6 are sectional views on the lines 5—5 and 6—6 of Fig. 4; and

Fig. 7 is a sectional view on the line 7—7 of Fig. 1.

Referring to the drawings, a shaft 10, nonrotatably mounted in or behind an aircraft fin 12 by brackets 14 and 16, provides a hinge axis for the rudder 18 and for the differentially mounted leading edge balance 20. Conventional horns 22 and control wires 24 are provided for the operation of the rudder. Both the rudder and its leading edge balance are rotatably mounted on the shaft 10 and a planetary gear means 26 provides for differential movement between the rudder 18 and its leading edge balance 20.

The planetary gear means 26 consists of a gear 28 secured to the rudder 18 by a bracket 30 and mounted to rotate upon the shaft 10. Segmental gear means 32 is keyed to the shaft 10 at 34 and consists of two oppositely directed segmental internal reaction gear sections 36 and 38. A bracket or spider 40, secured to the leading edge balance is rotatably mounted on the shaft 10 and carries pinions 42 and 44 adapted to mesh with gear 28 and internal segmental gears 36 and 38 respectively. As a result of this construction, a given deflection of the rudder 18 produces an opposed deflection of smaller magnitude of the leading edge balance 20, as illustrated in Fig. 3. The amount of the differential movement between the rudder and its leading edge balance is determined by the gear ratio of the planetary gear system 26. It is also within the scope of this invention to provide means other than the planetary gear train to accomplish this differential movement.

The differentially mounted leading edge balance 20 is provided with a trailing edge portion 46 which overlaps the rudder to provide a smooth air flow thereover. Also, the leading edge of the rudder is curved inwardly as at 48 to permit differential movement between the rudder and its balance member, and resilient sealing means 49 is provided therebetween. The balance member 20 extends into a recess 50 provided in the trailing edge of the fixed airfoil or fin 12 and a gap 52 is provided between both sides of the balance and the trailing edge of the recess 50. Also, a seal 54 is secured along the edge of the balance within the recess 50 for cooperation with the walls of the recess. This seal and the leading edge balance thereby divide the recess 50 into two chambers 58 and 60 which, in all positions of the rudder and its balance, are in continuous communication with opposite sides of the airfoil through the gaps 52.

The operation of the device is now apparent. When the rudder is deflected, for example as illustrated in Fig. 3, the air flow over the rudder results in a turning moment acting on the rudder tending to return the rudder to its neutral position. This deflection of the rudder results in an increase in pressure on the side toward which the rudder is deflected and this increase in pressure is transmitted through the corresponding gap 52 to the chamber 60 wherein it reacts against the leading edge balance to thereby help balance the turning moment on the rudder. In view of the differential between the movement of the rudder and its leading edge balance, the desired range of rudder deflection may be obtained with the leading edge balance having a much greater chord length than is possible in the absence of this differential movement and without causing the leading edge of the balance to extend beyond the surface of the fixed airfoil. As a result of the greater chord length of the leading edge balance, the balance action is much stronger. This is so because although the work done by the pressure against the balance is proportional to the first power of the angle of deflection of the balance, it is also proportional to the square of the balance chord length.

It should be noted that although the invention has been described in connection with an aircraft rudder, it is not so limited and obviously may be applied to any aircraft control surface.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In combination, an airfoil, a control surface pivotally secured to the trailing edge thereof, said airfoil having a rearwardly opening recess within its trailing edge, a balance member for said control surface pivotally mounted to the trailing edge of said airfoil for deflection about said axis relative to both said control surface and airfoil, said balance member extending forwardly from its pivot axis into said recess to divide said recess into opposed chambers, each of said chambers being subjected to outside pressure conditions on its respective side of the airfoil, and differential gearing operatively interconnecting said control surface and balance member such that said balance member deflects about its axis simultaneously with deflection of said control surface about its axis but to a lesser extent.

2. In combination, an airfoil, a control surface pivotally mounted to the trailing edge thereof, said airfoil having a rearwardly opening recess within its trailing edge, a balance member for said control surface pivotally mounted to the trailing edge of said airfoil for deflection about said axis relative to both said control surface and airfoil, said balance member having converging sides extending forwardly therefrom into said recess to divide said recess into opposed chambers, the trailing edges of said sides of the balance member both overlapping the leading edge of the control surface so as to provide a substantially smooth continuation of the control surface and also being inwardly spaced from the trailing edge of said recess to establish communication between said chambers and the outside of the airfoil, and means including meshing gears operatively interconnecting said control surface and balance member such that said balance member deflects about its axis simultaneously with deflection of said control surface about its axis but to a lesser extent.

3. In combination, an airfoil, a control surface therefor pivotally secured to the trailing edge of said airfoil, said airfoil having a rearwardly opening recess within its trailing edge, a balance member for said control surface pivotally mounted about an axis adjacent to the leading edge of said control surface for deflection about said axis relative to both said control surface and airfoil, said axis being fixed relative to said airfoil and said balance member extending forwardly from said axis into said recess to divide said recess into a pair of opposed pressure chambers, each of said chambers being subjected to the air pressure outside its respective side of said airfoil, and differential means interconnecting said control surface and balance member such that said balance member deflects about its axis simultaneously with deflection of said control surface but to a lesser extent.

4. In combination, an airfoil, a control surface therefor pivotally mounted adjacent an edge of said surface, a balance member for said control surface housed within said airfoil and subjected to an air pressure differential between opposite sides of said airfoil, said balance member being pivotally mounted about an axis at an edge thereof disposed adjacent to said control surface for deflection about said axis relative to both said control surface and airfoil, said axis being fixed relative to said airfoil, and differential means operatively interconnecting said control surface and balance member such that said balance member deflects about its axis simultaneously with deflection of said control surface about its axis but to a lesser extent.

5. In combination, an airfoil, a control surface therefor pivotally secured to said airfoil about an axis adjacent to the trailing edge of said airfoil, said airfoil having a rearwardly opening recess within its trailing edge, a balance member for said control surface pivotally secured to the trailing edge of said airfoil for deflection about said axis relative to both said control surface and airfoil, said balance member extending forwardly from its pivotal support into said recess to divide said recess into opposed chambers, the trailing edge of said balance member overlapping the leading edge of said control surface, each of said chambers being subjected to the air pressure outside its respective side of said airfoil, and means operatively interconnecting said control surface and balance member such that said balance member deflects about said axis in the same rotative direction and simultaneously with deflection of said control surface about said axis but to a lesser extent.

6. In combination, an airfoil, a control surface therefor pivotally secured to said airfoil about an axis adjacent to the trailing edge of said airfoil, said airfoil having a rearwardly opening recess within its trailing edge, a balance member for said control surface pivotally secured to the trailing edge of said airfoil for deflection about said axis relative to both said control surface and airfoil, said balance member having converging sides extending forwardly from said axis into said recess to divide said recess into a pair of opposed chambers, each of said chambers being subjected to the air pressure outside its respective side of said airfoil, the trailing edges of said sides overlapping the leading edge of said control surface, and differential means operatively interconnecting said control surface and balance member such that said balance member deflects about said axis in the same rotative direction and simultaneously with deflection of said control surface about said axis but to a lesser extent.

7. In combination, an airfoil, a control surface therefor pivotally secured to said airfoil about an axis adjacent to the trailing edge of said airfoil, said airfoil having a rearwardly opening recess within its trailing edge, a balance member for said control surface pivotally secured to the trailing edge of said airfoil for deflection about said axis relative to both said control surface and airfoil, said balance member extending forwardly from said axis into said recess to divide said recess into a pair of opposed chambers, each of said chambers being subjected to the air pressure outside its respective side of said airfoil, and differential means operatively interconnecting said control surface and balance member such that said balance member deflects about said axis in the same rotative direction and simultaneously with deflection of said control surface about said axis but to a lesser extent.

8. In combination, an airfoil, a control surface therefor pivotally secured to the trailing edge of said airfoil, said airfoil having a rearwardly opening recess within its trailing edge, a balance member for said control surface pivotally secured to the trailing edge of said airfoil for deflection about its pivot axis relative to both said control surface and airfoil, said balance member extending forwardly from its pivotal support into said recess to divide said recess into opposed chambers, each of said chambers being subjected to the air pressure outside its respective side of said airfoil, and differential means operatively interconnecting said control surface and balance member such that said balance member deflects about its pivot axis simultaneously with deflection of said control surface about its pivot axis but to a lesser extent, said means being disposed within the confines of said control surface and balance member.

9. In combination, an airfoil, a control surface therefor pivotally secured to the trailing edge of said airfoil, said airfoil having a rearwardly opening recess within its trailing edge, a balance member for said control surface pivotally secured to the trailing edge of said airfoil and extending forwardly from its pivotal support into said recess to divide said recess into opposed chambers, each of said chambers being subjected to the air pressure outside its respective side of said airfoil, and planetary gear means operatively interconnecting said control surface and balance member such that deflections of the control surface are greater than the associated deflections of the balance member.

10. In combination, an airfoil, a control surface therefor pivotally secured to the trailing edge of said airfoil, said airfoil having a rearwardly opening recess within its trailing edge, a balance member for said control surface pivotally secured to the trailing edge of said airfoil and extending forwardly from its pivotal support into said recess to divide said recess into opposed chambers, each of said chambers being subjected to the air pressure outside its respective side of the airfoil, and means operatively interconnecting said control surface and balance member, said means comprising a pair of gears, the one gear being rotationally rigid relative to said control surface and the other gear being rotationally rigid relative to said airfoil, and a planet pinion gear carried by said balance member and disposed in meshing engagement with said pair of gears such that deflections of the control surface are greater than the associated deflections of the balance member.

ROBERT A. DARBY.

REFERENCES CITED

The following references are of record in the file of this patent:

UNITED STATES PATENTS

| Number | Name | Date |
| --- | --- | --- |
| 1,710,672 | Bonney | Apr. 23, 1929 |
| 2,152,033 | Dornier | Mar. 28, 1939 |
| 2,211,870 | Wagner et al. | Aug. 20, 1940 |
| 2,238,403 | Soderquist et al. | Apr. 15, 1941 |
| 2,361,275 | Davie | Oct. 24, 1944 |

FOREIGN PATENTS

| Number | Country | Date |
| --- | --- | --- |
| 491,538 | Great Britain | Sept. 5, 1939 |
| 645,657 | Germany | June 1, 1937 |
| 693,900 | Germany | July 20, 1940 |